Patented June 18, 1946

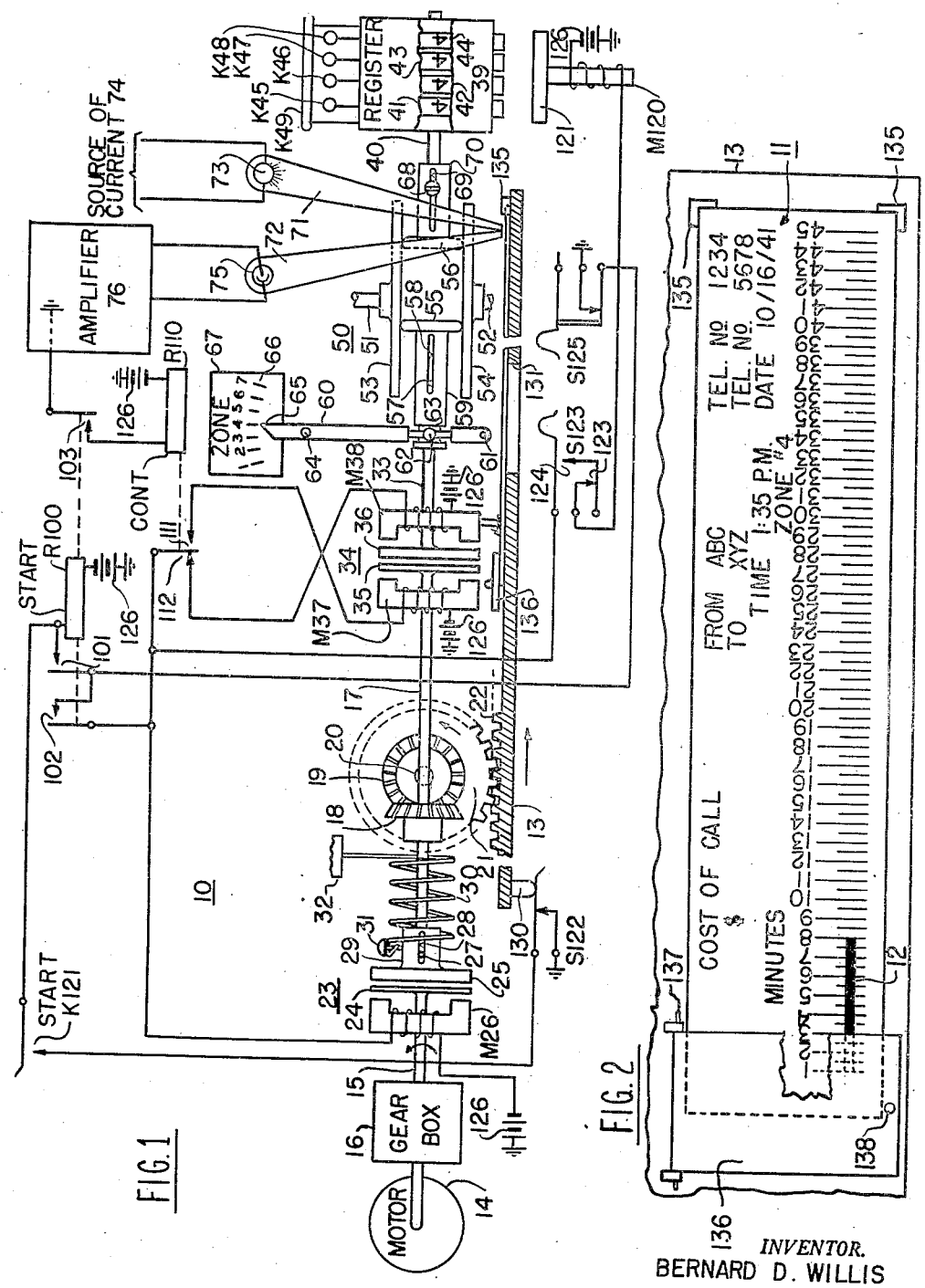

2,402,222

UNITED STATES PATENT OFFICE 2,402,222

MACHINE FOR CALCULATING THE COST OF TELEPHONE CALLS

Bernard D. Willis, Oak Park, Ill., assignor to Automatic Electric Laboratories, Inc., a corporation of Delaware Application November 21, 1941, Serial No. 419,848

6 Claims. (Cl. 235—61.6)

The present invention relates to machines for calculating the cost of telephone calls.

In accordance with accepted telephone practice, individual tickets are prepared at the operator positions at the switchboard in conjunction with the telephone calls set up, for which special charges are made. The prepared tickets are then forwarded to the billing department where the cost of the various telephone calls is calculated manually from the data appearing upon the corresponding tickets. Ordinarily the total charge for a telephone call comprises the sum of an initial charge, representing the initial three minute time interval of the time duration of the call, and an additional charge, representing the overtime beyond the initial three minute time interval of the time duration of the call; also the individual amounts of the two charges mentioned are determined in accordance with the zone or rate applicable to the call.

Accordingly, the principal object of the present invention is to provide a machine which is operative to calculate the cost of a telephone call from a previously prepared ticket.

Another object of the invention is to provide a machine of the type noted which embodies an arrangement for printing the cost of the call in monetary values on the ticket after the calculation mentioned is made.

A further object of the invention is to provide a machine of the type noted which is of relatively simple and compact construction and arrangement and substantially entirely fully automatic in operation and which renders thoroughly reliable service.

The invention, both as to its organization and method of operation, together with further objects and advantages thereof, will best be understood by reference to the following specification taken in connection with the accompanying drawing, in which Figure 1 illustrates schematically a machine for calculating the cost of a toll call in monetary values from a previously prepared toll ticket and embodying the present invention; and Fig. 2 is a fragmentary plan view of a portion of the carriage of the machine shown in Fig. 1 supporting one of the previously prepared toll tickets.

Referring now more particularly to the drawing, there is illustrated a machine 10 which is operative to calculate the cost of a toll call in monetary values from a previously prepared toll ticket 11 and then to print the calculated cost upon the face of the toll ticket 11.

Preferably, the toll ticket 11 is of the form of that disclosed in U. S. Patent No. 2,216,528, Bernard D. Willis, granted October 1, 1940, and is produced by a ticket producing machine of the character of that also disclosed in the patent mentioned. As disclosed in the Willis patent, the ticket producing machine is disposed at a toll operator position and is operatively associated with one of the cord circuits thereat; the ticket producing machine and the associated cord circuit are so organized that a line is scribed or drawn along the front marginal edge of the preprinted toll ticket 11 during the time interval the toll connection is established, whereby the length of the line mentioned corresponds to the time duration of the completed toll connection.

Also the operator at the toll operator position fills out the necessary data on the preprinted toll ticket 11 concerning the calling and called exchanges, the calling and called subscriber substations, the zone or rate applicable to the call between the calling and called exchanges, the date of the call and the time of completion or termination of the call, as practice requires. The completed toll ticket 11 is then forwarded to the billing department wherein the calculating machine 10 is utilized to establish the cost of the call in monetary values and to print the established cost of the call on the face of the toll ticket 11, in a manner more fully explained hereinafter.

Referring now more particularly to Fig. 2 of the drawing, it is noted that the completed toll ticket 11 there illustrated was prepared at the toll operator position in conjunction with a toll call which was extended from a calling subscriber substation having the directory number 1234 in the originating exchange ABC to a called subscriber substation having the directory number 5678 in the terminating exchange XYZ; that the zone or rate 4 is applicable to the call; that the call was made on 10/16/41; and that the call was completed or terminated at 1:35 p. m., as practice requires. Further it will be noted that the ticket producing machine at the toll operator position scribed or drew a line 12 along the front marginal edge of the toll ticket 11 with reference to the indicia scale preprinted thereon indicating that the toll call was completed during a time interval of eight minutes.

Referring now more particularly to Fig. 1 of the drawing, it is noted that the calculating machine 10 comprises a carriage 13 suitably mounted for sliding movement back and forth in a horizontal plane, an operating motor 14, a rotatably mounted drive shaft 15 and an interconnecting gear box 16. Preferably, the motor 14 is an electric motor of the constant speed synchronous type; and the gear box 16 contains suitable reduction gearing, whereby the drive shaft 15 is constantly driven at a substantially uniform slow speed in the counterclockwise direction. Also the machine 10 comprises a rotatably mounted operating shaft 17 carrying a bevel gear 18 which meshes a cooperating bevel gear 19 fixed to a rotatably mounted idler shaft 20; the operating shaft 17 being disposed in alignment with the drive shaft 15 and the idler shaft 20 being disposed behind and in right angular intersecting relationship with respect to the operating shaft 17. The bevel gear 19 carries a drive gear 21 which is arranged in meshing relation with respect to a rack 22 fixed to the carriage 13.

Also the machine 10 comprises clutch mechanism 23 which is adapted operatively to connect the drive shaft 15 to the operating shaft 17. More particularly, the clutch mechanism 23 comprises a nonmagnetic friction disk 24 secured to the outer end of the drive shaft 15, a magnetic friction plate 25 secured to the inner end of the operating shaft 17 and an electromagnet M26. The friction plate 25 is slidably secured to the operating shaft 17 for movement toward and away from the friction disk 24 by an arrangement comprising a pin and slot connection 27—28, the pin 27 being rigidly secured to the operating shaft 17 and slidably engaging the slot 28 formed in a sleeve 29 carried by the friction plate 25. The friction plate 25 and consequently the operating shaft 17 are normally biased in the clockwise direction by a helical coil spring 30 surrounding the operating shaft 17, one end of the coil spring 30 being secured to a pin 31 carried by the sleeve 29 of the friction plate 25 and the other end of the coil spring 30 being secured to an external support 32. Accordingly the coil spring 30 biases the operating shaft 17 and consequently the bevel gear 18 in the clockwise direction; whereby the cooperating bevel gear 19, the idler shaft 20 and the drive gear 21 are biased in the clockwise direction, thereby to urge the rack 22 and the carriage 13 toward the left into a fully retracted normal position.

Further the machine 10 comprises a rotatably mounted stub shaft 33 and clutch mechanism 34, the stub shaft 33 being arranged in alignment with the operating shaft 17 and the clutch mechanism 34 being adapted operatively to connect the operating shaft 17 to the stud shaft 33. More particularly, the clutch mechanism 34 comprises a nonmagnetic friction disk 35 secured to the outer end of the operating shaft 17, a magnetic friction disk 36 secured to the inner end of the stub shaft 33, and two electromagnets M37 and M38. The stub shaft 33 is slidably supported for movement toward and away from the operating shaft 17.

Further the machine 10 comprises a register 39, including a rotatably mounted register shaft 40 arranged in alignment with the stub shaft 33, a ten dollar order 41, a unit dollar order 42, a ten cent order 43, and a unit cent order 44; the orders mentioned being operatively connected to the register shaft 40 in accordance with conventional practice. Also the register 39 comprises a ten dollar order set key K45, a unit dollar order set key K46, a ten cent order set key K47 and a unit cent order set key K48, as well as a release or clearout key K49. It will readily be understood that the individual orders 41 to 44, inclusive, may be selectively set by the respective order set keys K45 to K48, inclusive, and that the register 39 may be released or cleared out by the release or clear-out key K49.

Further the machine 10 comprises speed control mechanism 50 of the friction type including two rotatably supported and aligned idler shafts 51 and 52 disposed in right angular relation with respect to the stub shaft 33 and the aligned register shaft 40, the two idler shafts 51 and 52 respectively carrying friction plates 53 and 54 arranged in substantially parallel spaced-apart relation and respectively disposed above and below the stub shaft 33 and the aligned register shaft 40. Also the speed control mechanism 50 comprises two friction wheels 55 and 56 disposed between the friction plates 53 and 54 and respectively carried by the outer end of the stub shaft 33 and the inner end of the register shaft 40. The friction wheel 55 is slidably secured to the stub shaft 33 by a pin and slot connection 57—58, the pin 57 being rigidly secured to the stub shaft 33 and slidably engaging the slot 58 formed in a sleeve 59 carried by the friction wheel 55. The position of the friction wheel 55 with respect to the center line of the aligned idler shafts 51 and 52, and consequently with respect to the centers of the friction plates 53 and 54, may be adjusted by an arrangement comprising a lever 60 pivotally mounted at its lower end upon a pivot pin 61. The intermediate portion of the lever 60 carries a lug 62 which rides in a cylindrical recess 63 provided in the sleeve 59 carried by the friction wheel 55; whereby the friction wheel 55 may be moved toward the centers of the friction plates 53 and 54 when the lever 60 is pivoted toward the right about the pivot pin 61 and away from the centers of the friction plates 53 and 54 when the lever 60 is pivoted toward the left about the pivot pin 61. The lever 61 is provided with a handle 64 to facilitate the pivotal movement thereof about the pivot pin 61, the outer end of the lever 60 carrying a pointer 65 which cooperates with an indicia scale 66 provided on a zone card 67. At this point it is noted that the indicia scale 66 provided on the zone card 67 is graduated in accordance with the various zones or rates of the telephone system.

Also the friction wheel 56 is slidably connected to the register shaft 40 by an arrangement comprising a set screw slot connection 68—69, the set screw 68 being threaded in the register shaft 40 and engaging the slot 69 formed in a sleeve 70 carried by the friction wheel 56. This arrangement permits the position of the friction wheel with respect to the center line of the aligned idler shafts 51 and 52, and consequently the centers of the friction plates 53 and 54, to be adjusted at will, in an obvious manner.

Further the machine 10 comprises a light projecting hood 71 and a cooperating light receiving hood 72. The upper end of the light projecting hood 71 carries an incandescent lamp 73 of any suitable type which is connected to a suitable source of current 74; while the upper end of the light receiving hood 72 carries a photoelectric cell 75 of any suitable type which is connected to a suitable amplifier 76. The hoods 71 and 72 are arranged in converging relation, whereby the lower ends thereof are disposed in substantially intersecting relation and closely adjacent to the front marginal edge of the toll ticket 11 supported by the carriage 13, for a purpose more fully explained hereinafter.

Finally the machine 10 comprises an electric circuit network including a start relay R100, a control relay R110, a stamp magnet M120, a start key K121, an off-normal switch S122, a stamp switch S123, a restore switch S125, and a battery 126. The carriage 13 carries a projection 130 which normally operates the off-normal switch S122 when the carriage 13 occupies its normal or fully retracted position. Also the projection 130 operates the stamp switch S123 when the carriage 13 is advanced to the right to a position wherein an opening 131 formed therein is arranged in alignment with a head 121 provided on the stamp magnet M120; also at this time the opening 131 provided in the carriage 13 is disposed below and in alignment with the various orders in the register 39. More particularly, at this time, the various orders in the register 39 are disposed above the indicia "Cost of call" on the face of the preprinted toll ticket 11 for a purpose more fully explained hereinafter. Finally the projection 130 operates the restore switch S125 when the carriage 13 is advanced to the right into a limit position for a purpose more fully explained hereinafter.

In order properly to support the toll ticket 11 upon the carriage 13, an arrangement is provided, comprising two spaced-apart angular guides 135 and a guard 136 carried by the carriage 13. More particularly, the angular guides 135 are disposed on the right-hand end of the carriage 13 and spaced apart a distance corresponding to the width of the toll ticket 11; while the guard 136 is pivotally mounted on a pivot pin 137 carried by the carriage 13 adjacent the rear marginal edge of the toll ticket 11 and intermediate the ends of the carriage 13. The pivotally mounted guard 136 carries a button 138 adjacent the front edge thereof in order to facilitate pivotal movement of the guard 136 about the pivot pin 137. It is noted that the guard 136 is spaced a fixed distance from the guides 135, whereby the left-hand end of the toll ticket 11 is covered thereby up to the reference character "3" of the indicia scale disposed along the front marginal edge of the toll ticket 11 when the guard 136 occupies its closed position. Accordingly, when the toll ticket 11 is properly supported upon the carriage 13, as determined by the angular guides 135 and the guard 136, the guard 136 covers the left-hand end of the toll ticket 11 up to the reference character "3" of the indicia scale provided along the front marginal edge of the toll ticket 11, for a purpose more fully explained hereinafter.

Considering now the operation of the calculating machine 10 to establish a charge for the toll call represented by the toll ticket 11, the operator in the Billing Department first examines the toll ticket 11 and notes that the zone or rate is "4." The operator then sets the pivotal lever 60 by means of the handle 64 carried thereby, whereby the pointer 65 provided on the outer end of the lever 60 cooperates with the character "4" of the indicia scale 66 provided on the zone card 67. The adjustment of the lever 60 with reference to the zone card 67 effects a corresponding adjustment of the position of the friction wheel 55 with respect to the centers of the aligned friction plates 53 and 54, in an obvious manner. The operator then determines that the motor 14 is operating in order to cause the drive shaft 15 to be driven at a substantially constant speed in the counterclockwise direction; and determines that the incandescent lamp 73 disposed in the outer end of the light projecting hood 71 is burning. The operator then positions the toll ticket 11 in its proper supported position upon the carriage 13 as determined by the angular guides 135 and the guard 136, the guard 136 covering the left-hand end of the toll ticket 11 up to the character "3" of the indicia scale provided along the front marginal edge of the toll ticket 11. The operator then operates the release or clear-out key K49 in order positively to insure that the register 39 is released or cleared out at this time.

The operator then operates appropriate ones of the order set keys K45 to K48, inclusive, thereby to enter in the corresponding orders 41 to 44, inclusive, of the register 39 an amount in monetary values corresponding to the initial charge for the first three minutes of time duration of the toll call. Finally the operator momentarily operates the start key K121, thereby to complete an obvious circuit, including the off-normal switch S122 and the battery 126, for energizing the winding of the start relay R100. When thus energized the start relay R100 operates to complete, at the contacts 101, an obvious holding circuit, including the restore switch S125 and the battery 126, for energizing the winding thereof. Also the start relay R100 completes, at the contacts 102, an obvious circuit, including the restore switch S125 and the battery 126, for energizing the electromagnet M26 of the clutch mechanism 23. Further the start relay R100 completes, at the contacts 102, an obvious circuit, including the restore switch S125, the contacts 112 and the battery 126, for energizing the electromagnet M38 of the clutch mechanism 34. Finally the start relay R100 prepares, at the contacts 103, an obvious circuit, including the amplifier 76 and the battery 126, for energizing the winding of the control relay R110.

When the electromagnet M26 is thus energized the magnetic friction plate 25 is attracted and drawn toward the left along the operating shaft 17 into frictional engagement with the friction disk 24, whereby the operating shaft 17 is clutched to the drive shaft 15 and is rotated therewith in the counterclockwise direction. At this point it is noted that the friction plate 25 is moved toward the left by the electromagnet M26 against the bias of the coil spring 30; and that, as the operating shaft 17 is rotated in the counterclockwise direction, the coil spring 30 is wound. Rotation of the operating shaft 17 and consequently the bevel gear 18 in the counterclockwise direction drives the cooperating bevel gear 19, the idler shaft 20 and the drive gear 21 in the counterclockwise direction in an obvious manner. Rotation of the drive gear 21 in the counterclockwise direction drives the rack 22 and consequently the carriage 13 forwardly toward the right away from its normal position. When the electromagnet M38 of the clutch mechanism 34 is thus energized the magnetic friction disk 36 is attracted and moved toward the right further away from the cooperating friction disk 35, thereby positively to insure that the operating shaft 17 is declutched from the stub shaft 33 at this time. In this connection it is pointed out that the movement of the friction disk 36 and consequently the stub shaft 33 toward the right does not in any way affect the position of the friction wheel 55 with respect to the centers of the aligned friction plates 53 and 54 in view of the fact that the stub shaft 33 slides within the sleeve 59 carried by the friction wheel 55 due to the pin and slot connection 57—58. When the carriage 13 is moved toward the right away from its normal position the off-normal switch S122 is operated, thereby to interrupt a further point in the previously traced start circuit, including the start key K121, for energizing the winding of the start relay R100; however, the latter relay remains in its operated position at this time due to the completed holding circuit, including the restore switch S125, for energizing the winding thereof.

As the carriage 13 is moved toward the right from its normal position the light produced by the incandescent lamp 73 is projected by the light projecting hood 71 onto the right-hand end of the indicia scale provided along the front marginal edge of the toll ticket 11 and is reflected therefrom by the light receiving hood 72 onto the photoelectric cell 75. At this time there is no mark or line scribed or drawn on the right-hand end of the indicia scale provided along the front marginal edge of the toll ticket 11; accordingly, considerable light is reflected onto the photoelectric cell 75, whereby the amplifier 76 is controlled to maintain interrupted the previously mentioned circuit for energizing the winding of the control relay R110. During this preliminary movement of the carriage 13 toward the right from its normal position the operating shaft 17 is declutched from the stub shaft 33, as previously noted.

Subsequently, when the carriage 13 is moved further toward the right from its normal position and when the extreme outer end of the line 12 scribed or drawn on the indicia scale provided along the front marginal edge of the toll ticket 11 rides under the light projecting hood 71, there is a considerable reduction in the amount of light reflected from the toll ticket 11 by the light receiving hood 72 onto the photoelectric cell 75 due to the fact that the mark 12 mentioned is made by a contrasting or dark colored ink or the like. When the amount of light reflected onto the photoelectric cell 75 is thus decreased the amplifier 76 is controlled in an obvious manner, whereby the previously mentioned circuit for energizing the winding of the control relay R110 is completed. When thus energized the control relay R110 operates to interrupt, at the contacts 112, the previously traced circuit for energizing the electromagnet M38 of the clutch mechanism 34; and to complete, at the contacts 111, an obvious circuit, including the restore switch S125, the contacts 102 and the battery 126, for energizing the electromagnet M37 of the clutch mechanism 34. When the electromagnet M37 of the clutch mechanism 34 is thus energized the magnetic friction disk 36 is attracted and moved toward the left into engagement with the cooperating friction disk 35, whereby the operating shaft 17 is clutched to the stub shaft 33. It is again noted that the movement of the friction disk 36 and consequently the stub shaft 33 toward the left does not in any way affect the position of the friction wheel 55 with respect to the centers of the aligned friction plates 53 and 54. Accordingly, at this time, the stub shaft 33 and consequently the friction wheel 55 are rotated in the counterclockwise direction with the operating shaft 17. Rotation of the friction wheel 55 in the counterclockwise direction causes rotation of the friction plates 53 and 54 respectively in the clockwise and the counterclockwise directions; which rotations of the friction plates 53 and 54 effect rotation of the friction wheel 56 and consequently the register shaft 40 in the clockwise direction, in an obvious manner. Rotation of the register shaft 40 in the clockwise direction operates the unit cent order 44 in the register 39 directly, whereby the higher orders 43, 42 and 41 therein are intermittently operated in a manner well understood. Accordingly, rotation of the register shaft 40 in the clockwise direction effects operation of the register 39, whereby additional amounts are progressively entered in the orders therein.

When the carriage 13 is moved still further toward the right away from its normal position the right-hand marginal edge of the guard 136 rides under the light projecting hood 71, whereby there is a considerable increase in the amount of light reflected from the upper surface of the guard 136 by the light receiving hood 72 onto the photoelectric cell 75, due to the fact that the upper surface of the guard 136 is relatively bright or light reflecting. When the amount of light reflected onto the photoelectric cell 75 is thus increased the amplifier 76 is controlled in an obvious manner; whereby the previously traced circuit for energizing the winding of the control relay R110 is interrupted in order to cause the latter relay to restore. Upon restoring, the control relay R110 interrupts, at the contacts 111, the previously traced circuit for energizing the electromagnet M37 of the clutch mechanism 34; and recompletes, at the contacts 112, the previously traced circuit for energizing the electromagnet M38 of the clutch mechanism 34. When the electromagnet M38 of the clutch mechanism 34 is thus energized the magnetic friction disk 36 is attracted and moved toward the right away from the cooperating friction disk 35, whereby the operating shaft 17 is declutched from the stub shaft 33. When the stub shaft 33 is thus declutched further rotation of the register shaft 40 through the speed control mechanism 50 is arrested, thereby to arrest further operation of the register 39. Accordingly, at this time, the register 39 has been operated in order to enter an additional amount into the orders therein corresponding to the increment of charge for the toll call beyond the initial three minutes of conversational time. It will be understood that this operation of the register 39 and consequently the additional amount entered in the orders therein will be determined by the time interval during which the stub shaft 33 is clutched to the operating shaft 17; which time interval is determined by the photoelectric scanning arrangement including the incandescent lamp 73 and the photoelectric cell 75 in accordance with the length of the mark 12 drawn or scribed on the indicia scale provided along the front marginal edge of the toll ticket 11 toward the right beyond the "3" character of the indicia scale mentioned which is uncovered by the guard 136.

When the carriage 13 moves still further toward the right away from its normal position, and after complete operation of the register 39 as explained above, the projection 130 carried thereby operates the stamp switch S123; at this time the opening 131 provided in the carriage 13 is disposed directly above and in alignment with the head 121 of the stamp magnet M120 and below and directly in alignment with the various orders in the register 39. When the stamp switch S123 is thus operated there is completed, at the contacts 124 thereof, a circuit, including the contacts 123 thereof, the restore switch S125, the contacts 102 and the battery 126, for energizing the stamp magnet M120. When the stamp magnet M120 is thus energized the head 121 thereof is forced upwardly into the opening 131 provided in the carriage 13; whereupon the toll ticket 11 is forced into engagement with the various order wheels 41 to 44, inclusive, in the register 39. At this point it is noted that the various order wheels 41 to 44, inclusive, in the register 39 carry suitable type which is appropriately inked; whereby the total amount entered in the register 39 is printed on the face of the toll ticket 11 as the established charge for the toll connection in monetary values when the toll ticket 11 is moved into engagement therewith by the head 121 of the stamp magnet M120. Also the projection 130 carried by the carriage 13 operates the stamp switch S123, whereby there is interrupted, at the contacts 123 thereof, the previously traced circuit for energizing the stamp magnet M120 shortly after this circuit is completed at the contacts 124 thereof. Accordingly the stamp magnet M120 is energized only momentarily, whereby the head 121 thereof is first moved into the opening 131 provided in the carriage 13 and immediately withdrawn therefrom due to the action of gravity.

Finally when the carriage 13 moves still further toward the right away from its normal position the projection 130 carried thereby operates the restore switch S125; whereby there is interrupted the previously traced holding circuit for energizing the winding of the start relay R100 and the previously traced multiple circuits for energizing the electromagnet M26 of the clutch mechanism 23 and the electromagnet M38 of the clutch mechanism 34, whereupon the start relay R100 restores. Upon restoring, the start relay R100 interrupts, at the contacts 101, a further point in the previously traced holding circuit for energizing the winding thereof; interrupts, at the contacts 102, further points in the previously traced multiple circuits for energizing the electromagnet M26 of the clutch mechanism 23 and the electromagnet M38 of the clutch mechanism 34; and interrupts, at the contacts 103, a further point in the previously traced circuit for energizing the winding of the control relay R110. The deenergization of the electromagnet M38 of the clutch mechanism 34 unlocks the associated friction disk 36; the friction disks 35 and 36 being previously disengaged, as previously noted. The deenergization of the electromagnet M26 of the clutch mechanism 23 unlocks the friction plate 25, whereby the coil spring 30 retracts the friction plate 25 toward the right away from the associated friction disk 24. Accordingly, at this time, the drive shaft 15 is declutched from the operating shaft 17.

At this time the coil spring 30 is completely wound and operates to rotate the friction plate 25 and the connected operating shaft 17 in the clockwise direction. Rotation of the operating shaft 17 and the connected bevel gear 18 in the clockwise direction effects rotation of the associated bevel gear 19, the idler shaft 20 and the drive gear 21 in the clockwise direction, in an obvious manner. Rotation of the drive gear 21 in the clockwise direction drives the associated rack 22 and the connected carriage 13 from the right toward the left, whereby the carriage 13 is moved back into its normal position. When the carriage 13 is moved toward the left back into its normal position the coil spring 30 is completely unwound and the projection 130 carried by the carriage 13 reoperates the off-normal switch S122, thereby again to prepare the previously traced operating circuit for energizing the winding of the start relay R100. The operator then pivots the guard 136 carried by the carriage 13 about its pivot pin 137 and removes the toll ticket 11 from its supported position upon the carriage 13 in an obvious manner. At this time the calculating machine 10 is completely released and available for further use to calculate the cost of a toll call represented by another toll ticket, in the manner explained above.

In view of the foregoing explanation of the mode of operation of the calculating machine 10, it will be understood that, after the toll ticket 11 is placed upon the carriage 13 in its properly supported position and the start key K121 is operated, the calculating machine 10 operates entirely automatically to calculate the cost of the toll call represented by the toll ticket 11 and to print the cost of the toll call in monetary values upon the face of the toll ticket 11; and is then released and prepared for further operation. Also it is noted that the time interval during which the clutch mechanism 34 is operated in order to clutch the operating shaft 17 to the stub shaft 33 is proportional to the length of the mark 12 drawn or scribed on the indicia scale provided along the front marginal edge of the toll ticket 11 toward the right beyond the "3" character of the indicia scale mentioned which is uncovered by the guard 136. Accordingly, during the operation of the calculating machine 10 to calculate the cost of a toll call represented by a given toll ticket 11, the stub shaft 33 is rotated a predetermined number of revolutions in the counterclockwise direction depending upon the length of the mark 12 drawn or scribed on the indicia scale provided along the front marginal edge of the toll ticket 11, as noted above. This predetermined number of revolutions of the stub shaft 33 in the counterclockwise direction effects a proportional number of revolutions of the register shaft 40 in the clockwise direction, depending upon the position of the friction wheel 55 with respect to the centers of the aligned friction plates 53 and 54 due to the construction and arrangement of the speed control mechanism 50, in an obvious manner; while the position of the friction wheel 55 with respect to the centers of the aligned friction plates 53 and 54 is determined by the adjusted position of the lever 60 with respect to the associated zone card 67. In this connection it is pointed out that, when the pointer 65 carried by the lever 60 is adjusted to cooperate with successively lower characters on the indicia scale 66 provided on the zone card 67, the position of the friction wheel 55 is successively adjusted with respect to the centers of the aligned friction plates 53 and 54 successively further distances away from the centers thereof and toward the peripheries thereof; whereby the predetermined number of revolutions of the stub shaft 33 in the counterclockwise direction effects corresponding smaller proportional numbers of revolutions of the register shaft 40 in the clockwise direction, in an obvious manner. Each revolution of the register shaft 40 in the clockwise direction effects the entry of a fixed amount in the unit cent order 44 in the register 39, in a manner well understood; which fixed amount is initially established by the adjusted position of the friction wheel 56 with respect to the centers of the aligned friction plates 53 and 54. At this point it is noted that the initial adjusted position of the friction wheel 56 with respect to the centers of the aligned friction plates 53 and 54 may be selectively established by the adjustable set screwslot connection 68—69 between the sleeve 70 carried by the friction wheel 56 and the register shaft 40, in an obvious manner.

Finally, in connection with the operation of the calculating machine 10, it will be understood that the initial charge for the first three minutes of time duration of the toll call represented by a given toll ticket 11 is manually set up in monetary values in the register 39 by the operator; while the additional charge for the time duration of the toll call represented by the toll ticket 11 beyond the first three minutes mentioned is automatically entered in monetary values by the calculating machine 10 in the register 39; and the register 39 is operative to add the initial entry and the additional entry mentioned above, thereby to register the total charge in monetary values for the toll call represented by the toll ticket 11.

While one embodiment of the invention has been disclosed, it will be understood that various modifications may be made therein which are within the true spirit and scope of the invention.

What is claimed is:

1. A machine for calculating an item of cost for a telephone call from a previously prepared ticket bearing a reference indicative of the time duration of the call, comprising a carriage on which said ticket is mounted, a first shaft, means for operating said first shaft at a substantially uniform speed, means actuated from said first shaft for moving said carriage at a uniform speed, a second shaft, clutch mechanism connecting said shafts, means governed in accordance with said reference borne by said ticket during its movement with said carriage for selectively operating said clutch mechanism to determine the time interval of operation of said second shaft, a third shaft, variable speed mechanism connecting said second shaft to said third shaft, means for manually adjusting said variable speed mechanism to regulate the relative speeds of said second and third shafts, and a register connected to said third shaft and operative to enter an item of cost for the call in accordance with the total operation of said third shaft.

2. A machine for calculating an item of cost for a telephone call from a previously prepared ticket individual thereto bearing both a reference indicative of the time duration of the call and a character indicative of the rate applicable to the call; said machine comprising a movable carriage adapted to support the ticket, a drive shaft, means for operating said drive shaft at a substantially uniform speed, a first shaft, first clutch mechanism operative to connect said drive shaft to said first shaft, means for selectively controlling the operation of said first clutch mechanism, drive mechanism connecting said first shaft and said carriage whereby said carriage is moved when said first shaft is operated, a second shaft, second clutch mechanism operative to connect said first shaft to said second shaft, means for scanning the reference borne by the ticket as said carriage is moved, means governed by said scanning means in accordance with the reference borne by the ticket for selectively controlling the operation of said second clutch mechanism to determine the time interval of operation of said second shaft, a third shaft, variable speed mechanism connecting said second shaft to said third shaft, means for manually adjusting said variable speed mechanism whereby the operator is permitted manually to adjust the relative speeds of said second and third shafts to correspond with said character borne by the ticket, and a register connected to said third shaft, said register being operative to establish an item of cost for the call in accordance with the total operation of said third shaft.

3. A machine for calculating an item of cost for a telephone call from a previously prepared ticket individual thereto bearing both a reference indicative of the time duration of the call and a character indicative of the rate applicable to the call; said machine comprising a movable carriage having a normal position and adapted to support the ticket, a drive shaft, means for operating said drive shaft at a substantially uniform speed, a first shaft, first clutch mechanism operative to connect said drive shaft to said first shaft, manually operable means for operating said first clutch mechanism, drive mechanism connecting said first shaft and said carriage, whereby said carriage is moved away from its normal position when said first shaft is operated, a second shaft, second clutch mechanism operative to connect said first shaft to said second shaft, means for scanning the reference borne by the ticket as said carriage is moved away from its normal position, means governed by said scanning means in accordance with the reference borne by the ticket for selectively controlling the operation of said second clutch mechanism, thereby to establish the time interval of operation of said second shaft, a third shaft, variable speed mechanism connecting said second shaft to said third shaft, manually operable means for selectively adjusting said variable speed mechanism, whereby said mechanism may be adjusted in accordance with the character borne by the ticket, thereby to establish the speed of operation of said third shaft with respect to the speed of operation of said second shaft, whereby the total operation of said third shaft is established, and a register connected to said third shaft, said register being operative to establish an item of cost for the call in accordance with the total operation of said third shaft, means controlled by a predetermined movement of said carriage away from its normal position for releasing said first clutch mechanism, and means responsive to the release of said first clutch mechanism for moving said carriage back to its normal position.

4. A machine for calculating an item of cost for a telephone call from a previously prepared ticket bearing a reference indicative of the time duration of the call, comprising a first shaft, means for operating said first shaft at a substantially uniform speed, a carriage for supporting said ticket and connected to be moved by said first shaft at a substantially uniform speed, a second shaft, clutch mechanism for connecting said shafts, light responsive means governed in response to said reference during the movement of the ticket with said carriage for selectively engaging and disengaging said clutch mechanism to determine the time interval of operation of said second shaft, a third shaft, variable speed mechanism connecting said second shaft to said third shaft, means for manually adjusting said variable speed mechanism to regulate the relative speeds of said second and third shafts, and a register connected to said third shaft and operative to enter an item of cost for the call in accordance with the total operation of said third shaft.

5. A machine for calculating an item of cost for a telephone call from a previously prepared ticket bearing a reference indicative of the time duration of the call, comprising a driving shaft, a driven shaft adapted to be rotated at a uniform speed by said driving shaft, a clutch for connecting said shafts, a carriage for supporting said ticket, means actuated by said driven shaft for moving said carriage at a uniform speed, a register, means including a second clutch for actuating said register from said driven shaft, means governed in accordance with said reference borne by said ticket during its movement with said carriage for selectively operating said second clutch to control the time interval of operation of said register, means for operating said first clutch to start the operation of said driven shaft and to stop the operation of said driven shaft after a predetermined movement of said carriage, and means operative when said first clutch is released for restoring said carriage to its initial position.

6. A machine for calculating an item of cost for a telephone call from a previously prepared ticket individual thereto bearing both a reference indicative of the time duration of the call and a character indicative of the rate applicable to the call, comprising a movable carriage adapted to support said ticket, means including a first shaft for moving said carriage with a substantially uniform speed, a second shaft, clutch mechanism operative to connect said first shaft to said second shaft, means for scanning the reference borne by said ticket as said carriage is moved, means governed by said scanning means in accordance with the reference borne by said ticket for selectively controlling the operation of said second clutch mechanism to determine the time interval of operation of said second shaft, a third shaft, variable speed mechanism connecting said second shaft to said third shaft, means for manually adjusting said variable speed mechanism whereby the operator is permitted manually to adjust the relative speeds of said second and third shafts to correspond with said character borne by said ticket, and a register connected to said third shaft and operative to establish an item of cost for the call in accordance with the total operation of said third shaft.

BERNARD D. WILLIS.